(12) United States Patent
Wiley et al.

(10) Patent No.: US 9,143,362 B2
(45) Date of Patent: Sep. 22, 2015

(54) N-PHASE POLARITY OUTPUT PIN MODE MULTIPLEXER

(71) Applicant: QUALCOMM Incorporated, San Diego, CA (US)

(72) Inventors: George A. Wiley, San Diego, CA (US); Glenn D. Raskin, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/933,090

(22) Filed: Jul. 1, 2013

(65) Prior Publication Data

US 2014/0003543 A1   Jan. 2, 2014

Related U.S. Application Data

(60) Provisional application No. 61/666,197, filed on Jun. 29, 2012.

(51) Int. Cl.
*H04L 27/00* (2006.01)
*H04L 25/02* (2006.01)
*G06F 13/38* (2006.01)
(Continued)

(52) U.S. Cl.
CPC .............. *H04L 25/02* (2013.01); *G06F 13/385* (2013.01); *H04L 25/0272* (2013.01); *H04L 25/14* (2013.01); *H04L 25/493* (2013.01); *H04L 25/4923* (2013.01); *H04L 5/1423* (2013.01); *H04L 5/16* (2013.01)

(58) Field of Classification Search
CPC .......... H04L 25/0272; H04J 3/14; H04B 3/04
USPC ........... 375/257, 259, 295, 377; 327/127, 231
See application file for complete search history.

(56) References Cited

U.S. PATENT DOCUMENTS 4,201,958 A    5/1980   Ahamed
4,980,898 A   12/1990   Silvian
(Continued)

FOREIGN PATENT DOCUMENTS

CN        1871635 A    11/2006
CN      101171776 B     5/2011
(Continued)

OTHER PUBLICATIONS

International Search Report and Written Opinion—PCT/US2013/048989—ISAEPO—Jan. 23, 2014.
(Continued)

*Primary Examiner* — Khanh C Tran
(74) *Attorney, Agent, or Firm* — Loza & Loza, LLP

(57) ABSTRACT

System, methods and apparatus are described that facilitate transmission of data, particularly between two devices within an electronic apparatus. Data is selectively transmitted as N-phase polarity encoded symbols or as packets on differentially driven connectors. A desired operational mode for communicating between the two devices is determined, an encoder is selected to drive a plurality of connectors communicatively coupling the two devices, and a plurality of drivers is configured to receive encoded data from the encoder and drive the plurality of connectors. Switches may couple outputs of the selected encoder to the plurality of drivers. One or more outputs of another encoder may be caused or forced to enter a high impedance mode.

44 Claims, 9 Drawing Sheets

(51) Int. Cl.
*H04L 25/14* (2006.01)
*H04L 25/49* (2006.01)
*H04L 25/493* (2006.01)
*H04L 5/14* (2006.01)
*H04L 5/16* (2006.01)

(56) References Cited

U.S. PATENT DOCUMENTS

| | | |
|---|---|---|
| 5,259,002 A | 11/1993 | Carlstedt |
| 5,359,595 A | 10/1994 | Weddle et al. |
| 5,381,414 A | 1/1995 | Gibson |
| 5,563,526 A * | 10/1996 | Hastings et al. ............... 326/37 |
| 5,664,948 A | 9/1997 | Dimitriadis et al. |
| 5,682,157 A | 10/1997 | Asmussen et al. |
| 5,733,131 A | 3/1998 | Park |
| 5,809,519 A | 9/1998 | Lee |
| 5,852,630 A | 12/1998 | Langberg et al. |
| 5,939,939 A | 8/1999 | Gaynor et al. |
| 6,081,513 A | 6/2000 | Roy |
| 6,091,709 A | 7/2000 | Harrison et al. |
| 6,243,761 B1 | 6/2001 | Mogul et al. |
| 6,256,509 B1 | 7/2001 | Tanaka et al. |
| 6,278,429 B1 * | 8/2001 | Ruth et al. ............... 345/94 |
| 6,288,739 B1 | 9/2001 | Hales et al. |
| 6,346,832 B1 | 2/2002 | Young |
| 6,359,931 B1 | 3/2002 | Perino et al. |
| 6,430,196 B1 | 8/2002 | Baroudi |
| 6,452,420 B1 | 9/2002 | Wong |
| 6,556,628 B1 | 4/2003 | Poulton et al. |
| 6,587,037 B1 | 7/2003 | Besser et al. |
| 6,611,503 B1 | 8/2003 | Fitzgerald et al. |
| 6,649,377 B1 | 11/2003 | Allard et al. |
| 6,654,565 B2 | 11/2003 | Kenny |
| 6,662,019 B2 | 12/2003 | Kamel et al. |
| 6,694,377 B1 | 2/2004 | Beyer |
| 6,703,868 B2 | 3/2004 | Savaria et al. |
| 6,778,493 B1 | 8/2004 | Ishii |
| 6,797,891 B1 | 9/2004 | Blair et al. |
| 6,813,638 B1 | 11/2004 | Sevanto et al. |
| 6,865,610 B2 | 3/2005 | Bolosky et al. |
| 6,867,668 B1 | 3/2005 | Dagostino et al. |
| 6,914,637 B1 | 7/2005 | Wolf et al. |
| 7,113,550 B2 | 9/2006 | Stonecypher et al. |
| 7,143,177 B1 | 11/2006 | Johnson et al. |
| 7,145,411 B1 | 12/2006 | Blair et al. |
| 7,233,773 B2 | 6/2007 | Hansen et al. |
| 7,263,133 B1 | 8/2007 | Miao |
| 7,269,430 B2 | 9/2007 | Moorti et al. |
| 7,336,139 B2 | 2/2008 | Blair et al. |
| 7,339,502 B2 | 3/2008 | Furtner |
| 7,529,957 B2 | 5/2009 | Krantz et al. |
| 7,539,882 B2 | 5/2009 | Jessup et al. |
| 7,688,929 B2 | 3/2010 | Co |
| 7,826,551 B2 | 11/2010 | Lee et al. |
| 7,859,356 B2 | 12/2010 | Pandey |
| 8,024,477 B2 | 9/2011 | Rothman et al. |
| 8,064,535 B2 | 11/2011 | Wiley et al. |
| 8,472,551 B2 | 6/2013 | Wiley |
| 8,848,810 B2 | 9/2014 | Lee et al. |
| 8,996,740 B2 | 3/2015 | Wiley et al. |
| 2002/0061072 A1 | 5/2002 | Pickering et al. |
| 2002/0064247 A1 | 5/2002 | Ahn et al. |
| 2002/0112070 A1 | 8/2002 | Ellerbrock et al. |
| 2002/0181618 A1 | 12/2002 | Muranaka |
| 2003/0117184 A1 | 6/2003 | Fecteau et al. |
| 2004/0039504 A1 | 2/2004 | Coffee et al. |
| 2005/0012492 A1 * | 1/2005 | Mihalka ............... 323/272 |
| 2005/0144225 A1 | 6/2005 | Anderson et al. |
| 2005/0151868 A1 | 7/2005 | Fraenkel et al. |
| 2005/0156755 A1 | 7/2005 | Miller |
| 2005/0204057 A1 | 9/2005 | Anderson et al. |
| 2006/0034326 A1 | 2/2006 | Anderson et al. |
| 2006/0192697 A1 | 8/2006 | Quick et al. |
| 2006/0271678 A1 | 11/2006 | Jessup et al. |
| 2007/0009018 A1 | 1/2007 | Wang |
| 2007/0160155 A1 | 7/2007 | Choi |
| 2007/0164883 A1 | 7/2007 | Furtner |
| 2007/0164884 A1 | 7/2007 | Ihs |
| 2008/0212709 A1 | 9/2008 | Wiley et al. |
| 2009/0082056 A1 | 3/2009 | Iwanaga et al. |
| 2009/0225873 A1 | 9/2009 | Lee et al. |
| 2010/0215118 A1 | 8/2010 | Ware et al. |
| 2010/0235673 A1 | 9/2010 | Abbasfar |
| 2011/0084737 A1 * | 4/2011 | Oh et al. ............... 327/108 |
| 2011/0138210 A1 | 6/2011 | Belali et al. |
| 2011/0268225 A1 | 11/2011 | Cronie et al. |
| 2011/0294359 A1 | 12/2011 | Cho et al. |
| 2011/0299555 A1 | 12/2011 | Cronie et al. |
| 2011/0302478 A1 | 12/2011 | Cronie et al. |
| 2012/0051241 A1 | 3/2012 | Mori et al. |
| 2012/0155565 A1 | 6/2012 | Wiley |
| 2012/0230626 A1 | 9/2012 | Metz et al. |
| 2013/0051162 A1 | 2/2013 | Amirkhany et al. |
| 2013/0215991 A1 | 8/2013 | Wiley |
| 2013/0241759 A1 | 9/2013 | Wiley et al. |
| 2013/0339507 A1 | 12/2013 | Wiley |
| 2014/0006649 A1 | 1/2014 | Wiley et al. |
| 2014/0112401 A1 | 4/2014 | Wiley et al. |
| 2014/0153665 A1 | 6/2014 | Wiley et al. |

FOREIGN PATENT DOCUMENTS

| | | |
|---|---|---|
| EP | 1207649 | 5/2002 |
| JP | 2002199032 A | 7/2002 |
| WO | 9202988 A1 | 2/1992 |
| WO | 2005041164 | 5/2005 |
| WO | WO-2011134678 A1 | 11/2011 |
| WO | WO-2011151469 A1 | 12/2011 |
| WO | WO-2012089803 A2 | 7/2012 |

OTHER PUBLICATIONS

Hsueh, "Crosstalk Suppression Technique for Multi-Wire High-Speed I/O Links," ProQuest Dissertations and Theses; 2010; UCLA, 189 pages.

International Search Report and Written Opinion—PCT/US2008/055566, International Search Authority—European Patent Office—Nov. 24, 2008.

International Search Report and Written Opinion—PCT/US2013/030937—ISA/EPO—Apr. 7, 2013.

International Search Report—PCT/US2009/034943, International Search Authority—European Patent Office Jun. 24, 2009.

John Poulton, et al., "Multiwire Differential Signaling," UNC-CH Department of Computer Science, Version 1.1, Aug. 6, 2003.

Sevanto, J., "Multimedia messaging service for GPRS and UMTS", IEEE on WCNC, Sep. 1999, pp. 1422-1426, vol. 3.

Taiwan Search Report—TW098107168—TIPO—May 10, 2012.

Written Opinion—PCT/US2009/034943, International Search Authority—European Patent Office Jun. 24, 2009.

Zheng, "Skew compensation techniques for multi-gigabit wire-line data communications," Dissertation, The University of Texas at Dallas, 2010, 126 pages.

Zogopoulos, "A Low-Power High-Speed Single-Ended Parallel Link Using Three-Level Differential Encoding," USC, Dissertation, May 2007, 92 pages.

International Preliminary Report on Patentability—PCT/US2013/030937, The International Bureau of WIPO—Geneva, Switzerland, Sep. 25, 2014.

International Preliminary Report on Patentability—PCT/US2013/045404, The International Bureau of WIPO—Geneva, Switzerland, Dec. 24, 2014.

International Preliminary Report on Patentability—PCT/US2013/048758—The International Bureau of WIPO Geneva, Switzerland, Oct. 7, 2014.

(56) References Cited

OTHER PUBLICATIONS

International Preliminary Report on Patentability—PCT/US2013/048989, The International Bureau of WIPO—Geneva, Switzerland, Oct. 7, 2014.
International Search Report and Written Opinion—PCT/US2013/045404—ISA/EPO—Sep. 12, 2013.
International Search Report and Written Opinion—PCT/US2013/048758—ISA/EPO—Aug. 16, 2013.
International Search Report and Written Opinion—PCT/US2014/067463—ISA/EPO—Apr. 16, 2015.
Taiwan Search Report—TW102121240—TIPO—Feb. 13, 2014.

* cited by examiner

N-PHASE POLARITY OUTPUT PIN MODE MULTIPLEXER

CROSS-REFERENCE TO RELATED APPLICATIONS

The present Application for Patent claims priority to Provisional Application No. 61/666,197 entitled "N-Phase Polarity Output Pin Mode Multiplexer" filed Jun. 29, 2012, which is assigned to the assignee hereof, which application is hereby expressly incorporated by reference herein.

BACKGROUND

1. Field

At least one aspect generally relates to high-speed data communications interfaces, and more particularly, multiplexing the input and output pins of an application processor.

2. Background

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and a display within mobile device. Some displays provide an interface that conforms to the Display System Interface (DSI) standard specified by the Mobile Industry Processor Interface Alliance (MIPI). Other displays may utilize other kinds of physical interfaces, which may be more efficient than the conventional DSI. It would be economical for the same application processor to be configured for use with more than one display interface.

SUMMARY

Embodiments disclosed herein provide systems, methods and apparatus that enable an application processor to communicate with a display using any of a plurality of interface standards. According to certain aspects described herein, two or more Integrated Circuit (IC) devices may be collocated in an electronic apparatus and communicatively coupled through one or more data links that can be configured as desired for compatibility with one of a plurality of interface standards.

In an aspect of the disclosure, a data transfer method comprises determining a type of physical interface to be used for communicating between two devices in a wireless mobile terminal, selecting an encoder to generate encoded data consistent with the type of physical interface to be used for communicating between the two devices, and configuring a plurality of drivers to receive the encoded data from the encoder and to drive a plurality of connectors communicatively coupling the two devices in accordance with the type of physical interface to be used for communicating between the two devices. The type of physical interface may be one of a plurality of types of physical interface supported by at least one of the two devices.

In an aspect of the disclosure, the data transfer method comprises controlling a plurality of switches to couple outputs of the selected encoder to the plurality of drivers.

In an aspect of the disclosure, the plurality of connectors comprises at least some bidirectional connectors. In an aspect of the disclosure, the plurality of connectors comprises at least some unidirectional connectors. In an aspect of the disclosure, the plurality of connectors comprises a combination of bidirectional and unidirectional connectors.

In an aspect of the disclosure, the encoder may provide the encoded data in differentially encoded signals. The plurality of drivers may be configured to receive the encoded data by causing one or more outputs of another encoder to enter a high impedance mode. The other encoder may be a different type of encoder and may comprise an N-phase encoder, for example.

In an aspect of the disclosure, the encoder provides encoded data in a sequence of symbols encoded using a combination of a phase state of a first pair of the connectors, a polarity of a second pair of connectors, and a selection of at least one undriven connector. The first pair of the connectors may comprise the same wires as the second pair of connectors. One or more outputs of a differential encoder may be caused to enter a high impedance mode. In one example, the encoded data may include video data related to a camera or a display controlled by one of the two devices.

In an aspect of the disclosure, an apparatus comprises a plurality of connectors communicatively coupling a first IC device with a second IC device, means for generating encoded data consistent with the type of physical interface to be used for communicating between the two devices, and means for configuring a plurality of drivers to receive the encoded data from one of the at least two encoders and to drive a plurality of connectors communicatively coupling the two devices in accordance with the type of physical interface to be used for communicating between the two devices. The means for generating encoded data may include at least two encoders that are configured to encode data in different manners. The plurality of connectors may comprise wires, traces or other electrically conductive connectors.

In an aspect of the disclosure, an apparatus comprises a plurality of connectors communicatively coupling a first device with a second device in a wireless mobile terminal, and a processing system configured to determine an operational mode for communicating between the first device and the second device, select an encoder to drive the plurality of connectors, and configure a plurality of drivers to receive encoded data from the encoder. The plurality of drivers may drive the plurality of connectors.

In an aspect of the disclosure, a processor-readable storage medium has one or more instructions that, when executed by at least one processing circuit, cause the at least one processing circuit to determine a type of physical interface to be used for communicating between two devices in a wireless mobile terminal, select an encoder to generate encoded data consistent with the type of physical interface to be used for communicating between the two devices, and configure a plurality of drivers to receive the encoded data from the encoder and to drive a plurality of connectors communicatively coupling the two devices in accordance with the type of physical interface to be used for communicating between the two devices. The type of physical interface may be one of a plurality of types of physical interface supported by at least one of the two devices.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
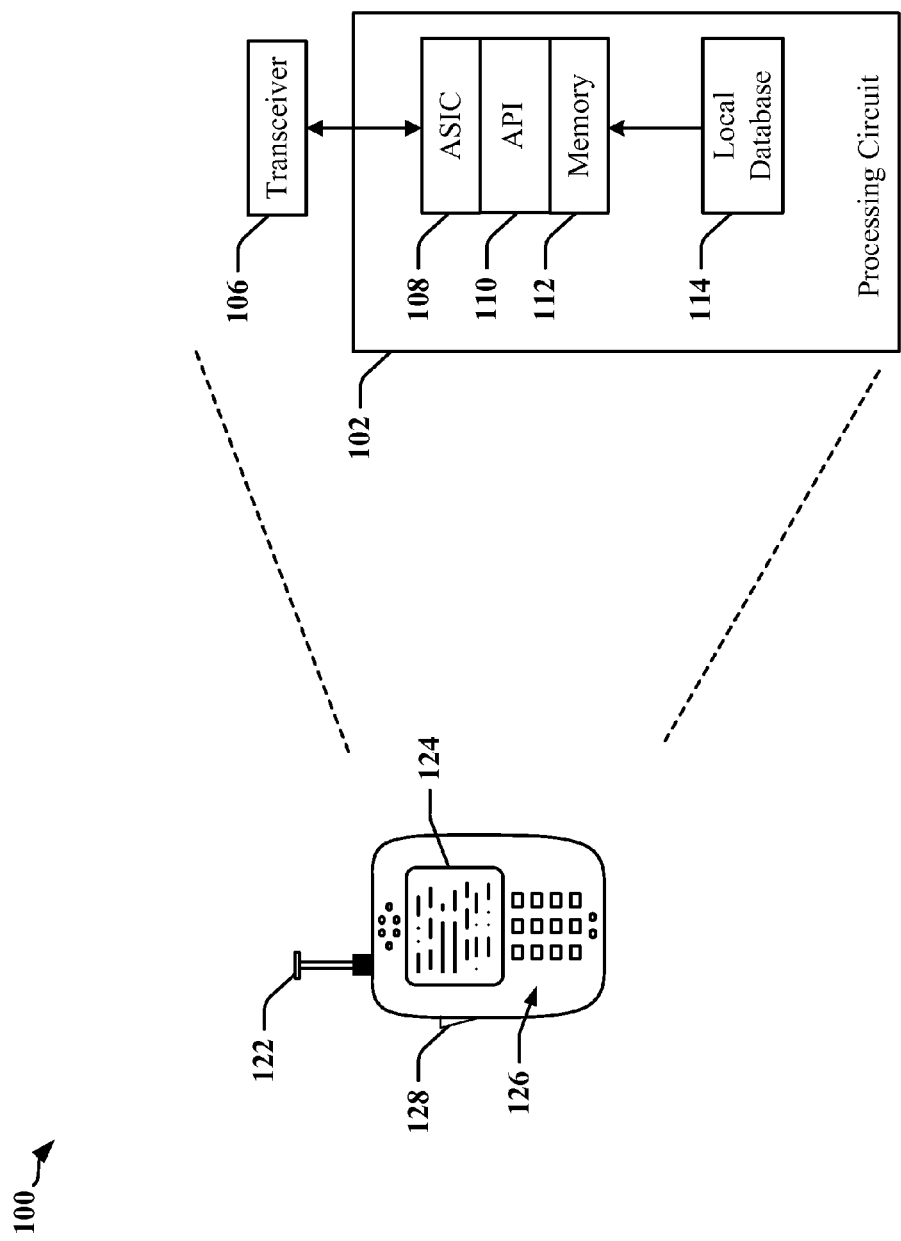
FIG. 1 depicts an apparatus employing a data link between IC devices that selectively operates according to one of plurality of available standards.

Certain embodiments of the invention may be applicable to communications links deployed between electronic components that may include subcomponents of a device, such as a telephone, a mobile computing device, an appliance, an automobile electronics, an avionics system, etc. FIG. 1 depicts an example of an apparatus 100 employing a data link between IC devices that selectively operates according to one of plurality of available standards. The apparatus 100 may comprise a wireless communication device that communicates wirelessly with a radio access network (RAN), a core access network, the Internet and/or another network. The apparatus 100 may include a communications transceiver 106 operably coupled to a processing circuit 102. The processing circuit 102 may comprise one or more IC devices, such as an application-specific IC (ASIC) 108. The ASIC 108 may include one or more processing devices, sequencers, logic circuits, and so on. The processing circuit 102 may include and/or be coupled to processor readable storage such as a memory device 112 that may maintain instructions and data the may be executed and otherwise used by the processing circuit 102. The processing circuit 102 may be controlled by one or more of an operating system and an application programming interface (API) 110 layer that supports and enables execution of software modules residing in the memory device 112. The memory device 112 may comprise read-only memory (ROM) and/or random-access memory (RAM), electrically-erasable programmable read only memory (EEPROM), a flash memory device, or any memory device that can be used in processing systems and computing platforms. Processing circuit 102 may include and/or access a local database 114 that can maintain operational parameters and other information used to configure and operate the apparatus 100. The local database 114 may be implemented using one or more of a database module or server, flash memory, magnetic media, EEPROM, optical media, tape, soft or hard disk, or the like. The processing circuit may also be operably coupled to external devices such as an antenna 122, a display 124, operator controls, such as a button 128 and a keypad 126, among other components.

Figure 2:
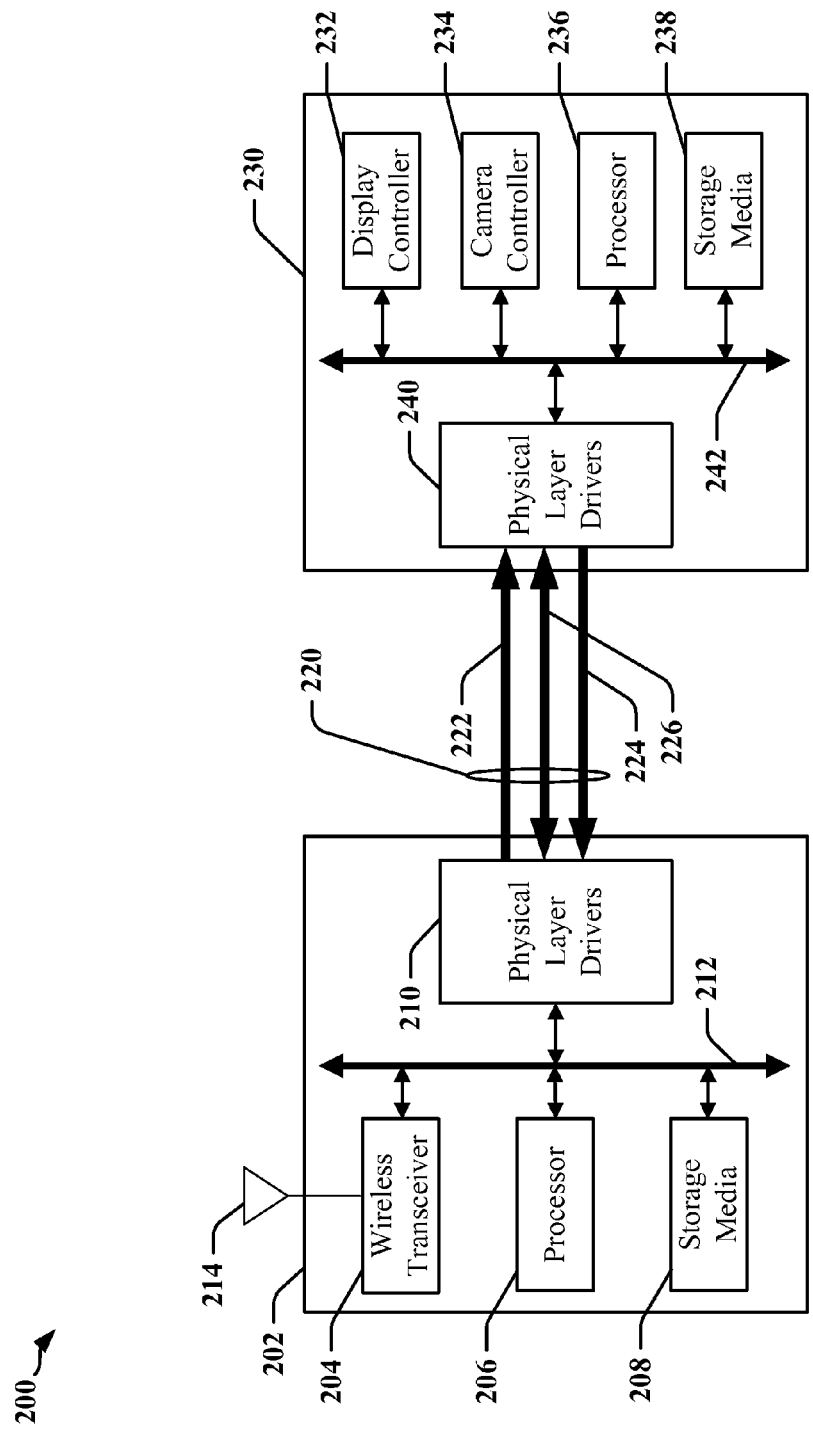
FIG. 2 illustrates a system architecture for an apparatus employing a data link between IC devices that selectively operates according to one of plurality of available standards.

FIG. 2 is a block schematic 200 illustrating certain aspects of an apparatus such as a wireless mobile device, a mobile telephone, a mobile computing system, a wireless telephone, a notebook computer, a tablet computing device, a media player, a gaming device, or the like. Apparatus 200 may comprise a plurality of IC devices 202 and 230 that exchange data and control information through a communications link 220. The communications link 220 may be used to connect the IC devices 202 and 230, which may be located in close proximity to one another or physically located in different parts of the apparatus 200. In one example, the communications link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communications link 220 may comprise a cable or optical connection.

The communications link 220 may comprise multiple channels/links 222, 224 and 226. One or more channel 226 may be bidirectional, and may operate in half-duplex and/or full-duplex modes. One or more channel 222 and 224 may be unidirectional. The communications link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each comprise a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may comprise circuits and software drivers that support a display such as a liquid crystal display (LCD) panel, a touch-screen display, an indicator and so on. The storage media 208 and 238 may comprise transitory and/or non-transitory storage devices adapted to maintain instructions and data used by the respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and the reverse link 224 may be capable of transmitting at comparable speeds or at different speeds, where speed may be expressed as data transfer rate and/or clocking rates. The forward and reverse data rates may be substantially the same or may differ by orders of magnitude, depending on the application. In some applications a single bidirectional link 226 may support communications between the first IC device 202 and the second IC device 230. The forward link 222 and/or the reverse link 224 may be configurable to operate in a bidirectional mode when, for example, the forward and reverse links 222 and 224 share the same physical connections and operate in a half-duplex manner.

In one example, the communications link 220 may be operated to communicate control, command and other information between the first IC device 202 and the second IC device 230 in accordance with an industry or other standard. Industry standards may be application specific. For example, the MIPI standard defines physical layer interfaces including a synchronous interface specification (D-PHY) between an application processor IC device 202 and an IC device 230 that supports the camera or display in a mobile device. The D-PHY specification governs the operational characteristics of products that comply with MIPI specifications for mobile devices. A D-PHY interface may support data transfers using a flexible, low-cost, high-speed serial interface that interconnects IC devices 202, 230 and/or other components within a mobile device. These interfaces may comprise complimentary metal-oxide-semiconductor (CMOS) compatible parallel busses providing relatively low bit rates with slow edges to avoid electromagnetic interference (EMI) issues.

Figure 3:
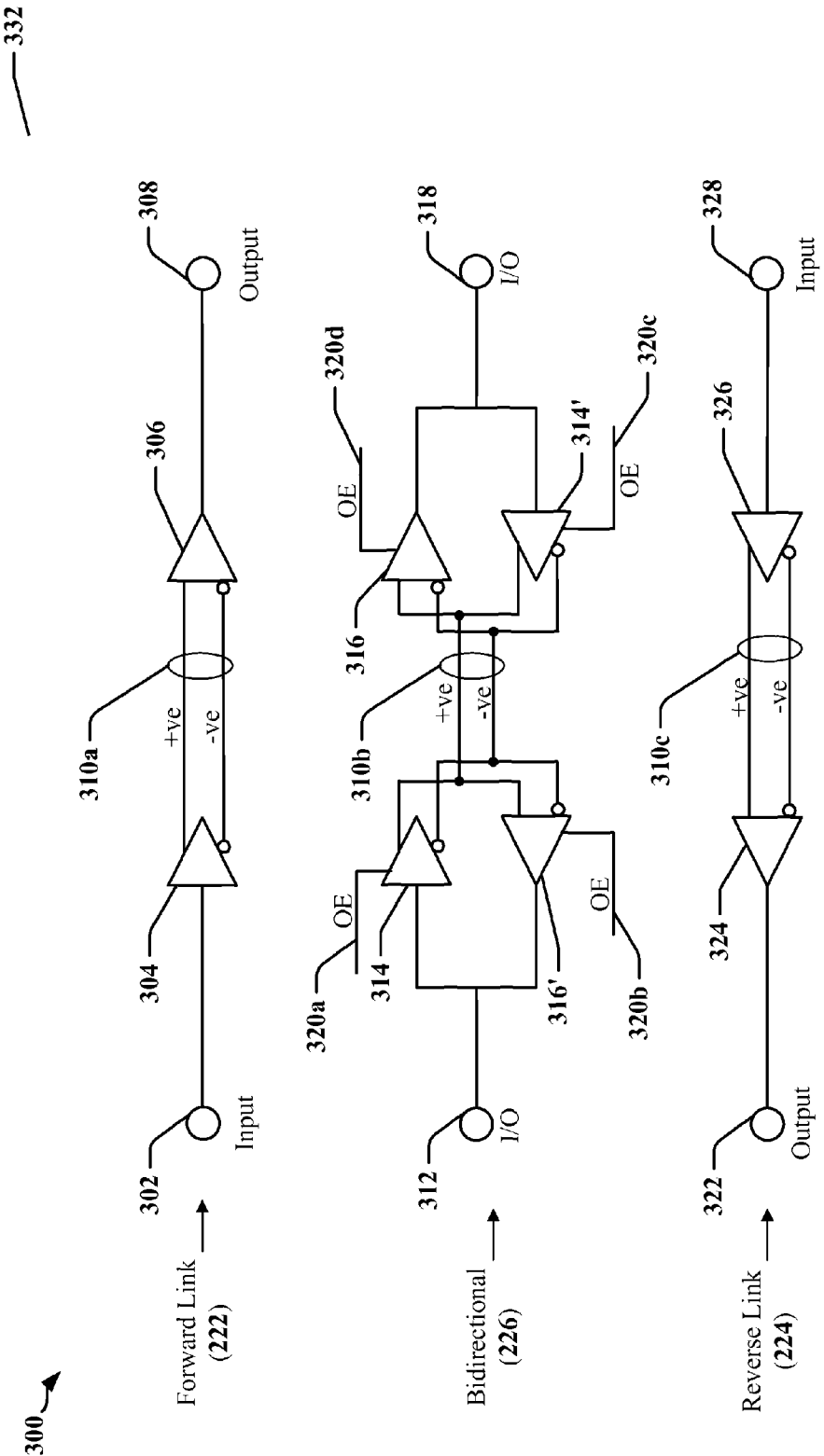
FIG. 3 illustrates an example of a data link using differential signaling.

FIG. 3 is a schematic diagram illustrating a differential signaling example of an implementation of the communication link 220 depicted in FIG. 2. Differential signaling typically involves transmitting information electrically using two complementary signals sent on a pair of wires 310a, 310b or 310c, which may be referred to as a differential pair. The use of differential pairs can significantly reduce EMI by canceling the effect of common-mode interference that affects both wires in a differential pair. On the forward link 222, a pair of wires 310a may be driven by a host differential amplifier 304. The differential amplifier 304 receives an input data stream 302 and generates positive and negative versions of the input 302, which are then provided to the pair of wires 310a. The differential receiver 306 on the client side generates an output data stream 308 by performing a comparison of the signals carried on the pair of wires 310a.

On the reverse link 224, one or more pairs of wires 310c may be driven by a client-side differential amplifier 326. The differential amplifier 326 receives an input data stream 328 and generates positive and negative versions of the input 328, which are provided to the pair of wires 310c. The differential receiver 324 on the host generates an output data stream 322 by performing a comparison of the signals carried on the pair of wires 310c.

In a bidirectional link 226, the host and client may be configured for half-duplex mode and may transmit and receive data on the same wire pair 310b. A bidirectional bus may alternatively or additionally be operated in full-duplex mode using combinations of the forward and reverse link drivers 304, 326 to drive multiple wire pairs 310a, 310c. In the half-duplex bidirectional implementation depicted for the bidirectional link 226, one or more transmitters/amplifiers 314 and 314' may be prevented from driving the wire pair 310b simultaneously using, for example, an output enable (OE) control 320a, 320c (respectively) to force the transmitters 314 and 314' into a high impedance state. The differential receiver 316' may be prevented from driving the input/output 312 while the differential transmitter 314 is active, typically using an OE control 320b to force the differential receiver 316' into a high impedance state. The differential receiver 316 may be prevented from driving the input/output 318 while the differential transmitter 314' is active, typically using an OE control 320d to force the differential receiver 316 into a high impedance state. In some instances, the outputs of the differential transmitters 314 and 314' and the differential receivers 316 and 316' may be in a high-impedance state when the interface is not active. Accordingly, the OE controls 320a, 320c, 320b and 320c of the differential transmitters 314, 314', and the differential receivers 316 and 316' may be operated independently of one another.

Each of the differential amplifiers 304, 314, 314' and 326 may comprise a pair of amplifiers, one receiving at one input the inverse of the input of the other amplifier. The differential amplifiers 304, 314, 314' and 326 may each receive a single input and comprise an internal inverter that generates an inverse input for use with a pair of amplifiers. The differential amplifiers 304, 314, 314' and 326 may also be constructed using two separately controlled amplifiers, such that their respective outputs can be placed in high impedance mode independently of one another.

According to certain aspects disclosed herein, systems and apparatus may employ multi-phase data encoding and decoding interface methods for communicating between IC devices 202 and 230. A multi-phase encoder may drive a plurality of conductors (i.e., M conductors). The M conductors typically comprise three or more conductors, and each conductor may be referred to as a wire, although the M conductors may comprise conductive traces on a circuit board or within a conductive layer of a semiconductor IC device. The M conductors may be divided into a plurality of transmission groups, each group encoding a portion of a block of data to be transmitted. An N-phase encoding scheme is defined in which bits of data are encoded in phase transitions and polarity changes on the M conductors. In one example, an N-phase encoding scheme for a three-wire system may comprise three phase states and two polarities, providing 6 states and 5 possible transitions from each state. Deterministic voltage and/or current changes may be detected and decoded to extract data from the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces, for example.

Figure 4:
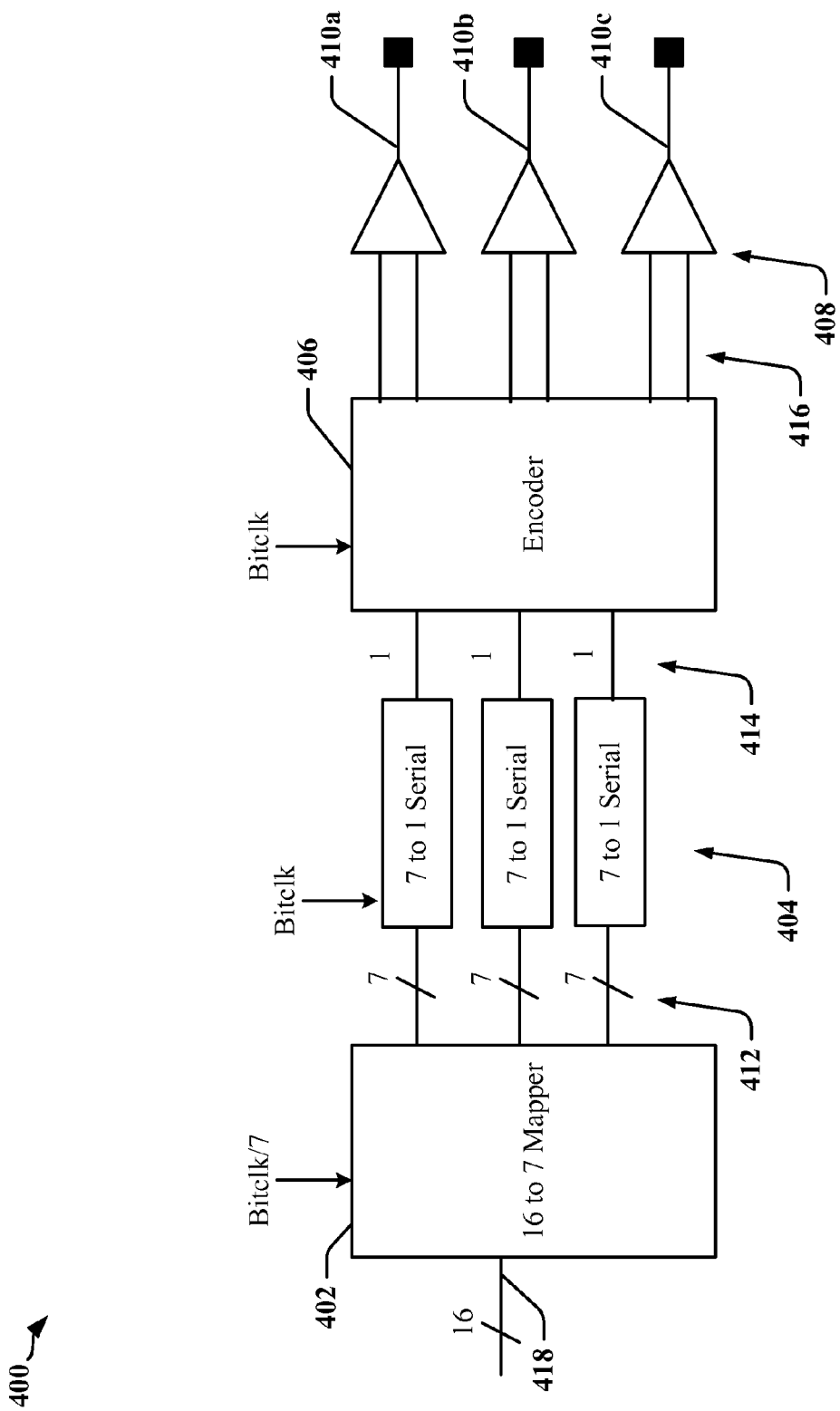
FIG. 4 illustrates an example of an N-phase polarity data encoder.

FIG. 4 is a schematic diagram illustrating the use of N-phase polarity encoding to implement certain aspects of the communication link 220 depicted in FIG. 2. The illustrated example may relate to a three-wire link or to a portion of a link that has more than three wires. The communication link 220 may comprise a wired bus having a plurality of signal wires, which may be configured to carry N-phase encoded data in a high-speed digital interface, such as a mobile display digital interface (MDDI). One or more of the channels 222, 224 and 226 may use N-phase polarity encoding. The physical layer drivers 210 and 240 may be adapted to encode and decode N-phase polarity encoded data transmitted on link 220. The use of N-phase polarity encoding provides for high speed data transfer and may consume half or less of the power of other interfaces because fewer than N drivers are active in N-phase polarity encoded data links 220 at any time. N-phase polarity encoding devices in physical layer drivers 210 and/or 240 can encode multiple bits per transition on the communications link 220. In one example, a combination of 3-phase encoding and polarity encoding may be used to support a wide video graphics array (WVGA), 80 frames per second LCD driver IC without a frame buffer, delivering pixel data for display refresh at 810 Mbps over three or more wires.

In the depicted example 400, an M-wire, N-phase polarity encoding transmitter is configured for M=3 and N=3. The example of three-wire, three-phase encoding is selected solely for the purpose of simplifying descriptions of certain aspects of this disclosure. The principles and techniques disclosed for three-wire, three-phase encoders can be applied in other configurations of M-wire, N-phase polarity encoders, and may comply or be compatible with other interface standards.

When N-phase polarity encoding is used, connectors such as signal wires 410a, 410b and 410c on an N-line bus may be undriven, driven positive, or driven negative. An undriven signal wire 410a, 410b or 410c may be in a high-impedance state. An undriven signal wire 410a, 410b or 410c may be driven or pulled to a voltage level that lies substantially halfway between the positive and negative voltage levels provided on driven signal wires. An undriven signal wire 410a, 410b or 410c may have no current flowing through it. In the example 400, each signal wire 410a, 410b and 410c may be in one of three states (denoted as +1, −1, or 0) using drivers 408. In one example, drivers 408 may comprise unit-level currentmode drivers. In another example, drivers 408 may drive opposite polarity voltages on two signal wires 410a and 410b while the third signal wire 410c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 410a, 410b or 410c is changed from the symbol transmitted in the preceding transmission interval.

In the example, 400, a mapper 402 may receive 16 bit data 418, and the mapper 402 may map the input data 418 to 7 symbols 412 for transmitting sequentially over the signal wires 410a, 410b and 410c. An M-wire, N-phase encoder 406 configured for three-wire, three-phase encoding receives the 7 symbols 412 produced by the mapper one symbol 414 at a time and computes the state of each signal wire 410a, 410b and 410c for each symbol interval. The 7 symbols 412 may be serialized using parallel-to-serial converters 404, for example. The encoder 406 selects the states of the signal wires 410a, 410b and 410c based on the input symbol 414 and the previous states of signal wires 410a, 410b and 410c.

The use of M-wire, N-phase encoding permits a number of bits to be encoded in a plurality of symbols where the bits per symbol is not an integer. In the simple example of a threewire, three-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 5:
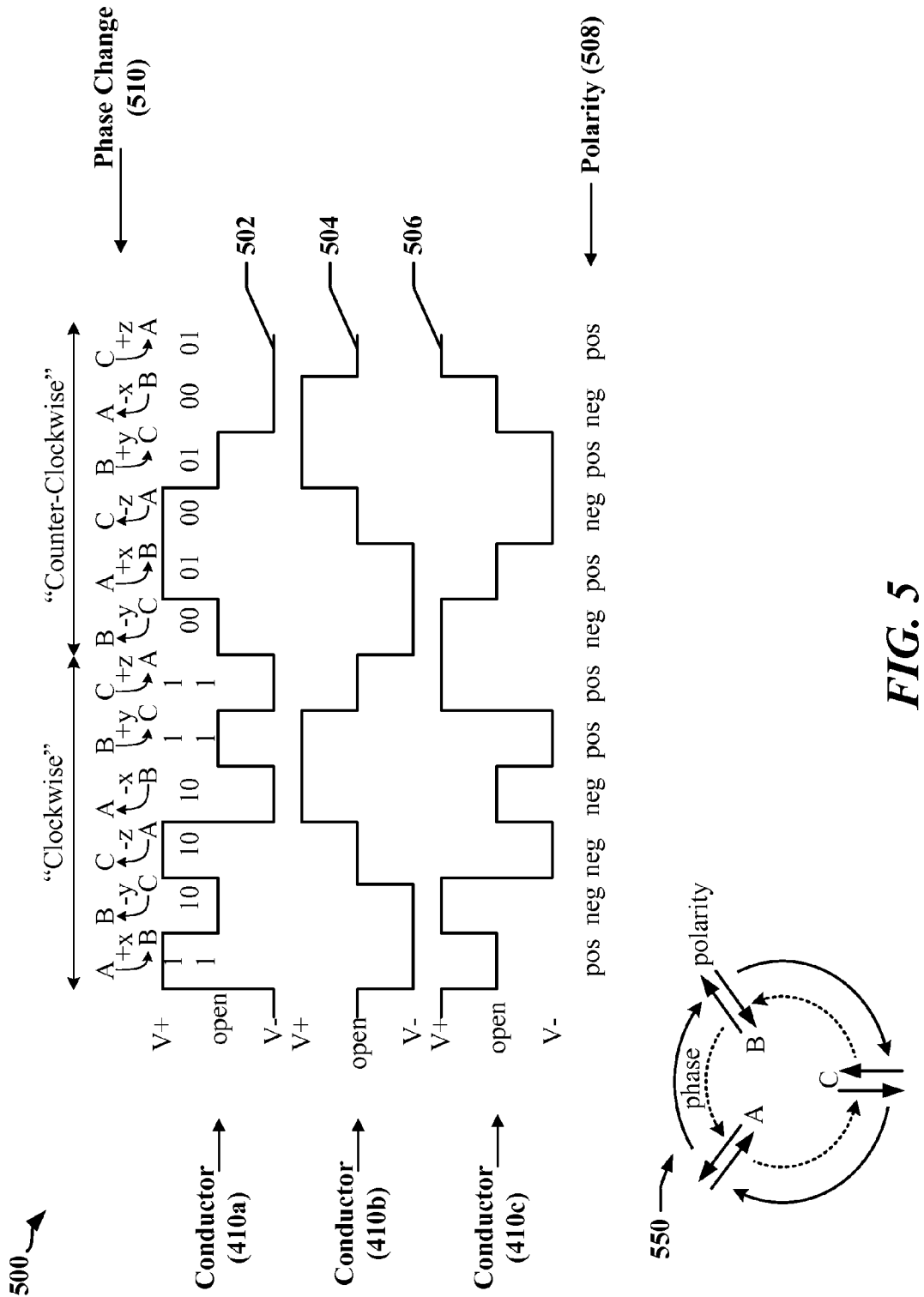
FIG. 5 illustrates signaling in an example of an N-phase polarity encoded interface.

FIG. 5 illustrates an example of signaling 500 employing a three-phase modulation data-encoding scheme based on the circular state diagram 550. According to the data-encoding scheme, a three-phase signal may rotate in two directions and may be transmitted on three conductors 410a, 410b and 410c. Each of the three signals carried by the conductors 410a, 410b, 410c comprises the three-phase signal each conductor 410a, 410b and 410c being independently driven, with each signal being 120 degrees out of phase relative to the other two signals. At any point in time, each of the three wires is in a different state (represented by V+, V− and open) from the other two wires. The encoding scheme also encodes information in the polarity of the two of the conductors 410a, 410b and 410c that are actively driven to a positive and negative level. Polarity is indicated at 508 for the sequence of states depicted.

At any phase state in a three-wire example, exactly two of the conductors 410a, 410b, 410c carry a signal which is effectively a differential signal for that phase state, while the third conductor 410a, 410b or 410c is undriven. The phase state for each conductor 410a, 410b, 410c may be defined by voltage difference between the conductor 410a, 410b, 410c and at least one other conductor 410a, 410b, 410c, or by the direction of current flow, or lack of current flow, in the conductor 410a, 410b, 410c. As shown in the state diagram 550, three phase states (corresponding respectively to states A, B and C) are defined with signal flow from state A to state B, state B to state C, and state C to state A in a first direction and signal flow from state A to state C, state C to state B, and state B to state A in a second direction. For other values of N, transitions between the N states may be defined according to a corresponding state diagram to obtain circular rotation between state transitions.

In the example of a three-wire, three-phase link, clockwise rotation (A to B), (B to C) or (C to A) at a state transition may be used to encode a logic 1, while counter-clockwise rotations (A to C), (C to B) or (B to A) at the state transition may be used to encode a logic 0. Accordingly a bit may be encoded at each transition by controlling whether the signal is "rotating" clockwise or counter-clockwise. For example, a logic 1 may be encoded when the three wires transition from state A to state B and a logic 0 may be encoded when the three wires transition from state B to state A. In the simple three-wire example depicted, direction of rotation may be easily determined based on which of the three wires is undriven before and after the transition.

Information may also be encoded in polarity of the driven conductors 410a, 410b, 410c or direction of current flow between two conductors 410a, 410b, 410c. Signals 502, 504, and 506 illustrate voltage levels applied to conductors 410a, 410b, 410c, respectively at each phase state in a three-wire, three-phase link. At any time, a first conductor 410a, 410b, 410c is coupled to a positive voltage (+V, for example), a second conductor 410a, 410b, 410c is coupled to a negative voltage (−V, for example), while the third conductor 410a, 410b, 410c may be open-circuited. As such, one polarity encoding state may be determined by the current flow between the first and second conductors 410a, 410b, 410c or the voltage polarities of the first and second conductors 410a, 410b, 410c. In some embodiments, two bits of data may be encoded at each phase transition. A decoder may determine rotation to obtain the first bit, and the second bit may be determined based on the polarity. The decoder having determined direction of rotation can determine the current phase state and the polarity of the voltage applied between the two active connectors 410a, 410b and/or 410c, or the direction of current flow through the two active conductors 410a, 410b and/or 410c.

In the example of the three-wire, three-phase link described herein, one bit of data may be encoded in the rotation, or phase change in the three-wire, three-phase link, and an additional bit may be encoded in the polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

N-Phase data transfer may use more than three wires provided in a communication link or bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6,4) = \frac{6!}{(6-4)! \cdot 4!} = 15$$

possible combinations of actively driven wires, with:

$$C(4,2) = \frac{4!}{(4-2)! \cdot 2!} = 6$$

different combinations of polarity for each phase state.

The 15 different combinations of actively driven wires may include:

| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may comprise:

++−−  +−−+  +−+−  −+−+  −++−  −−++

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 6:
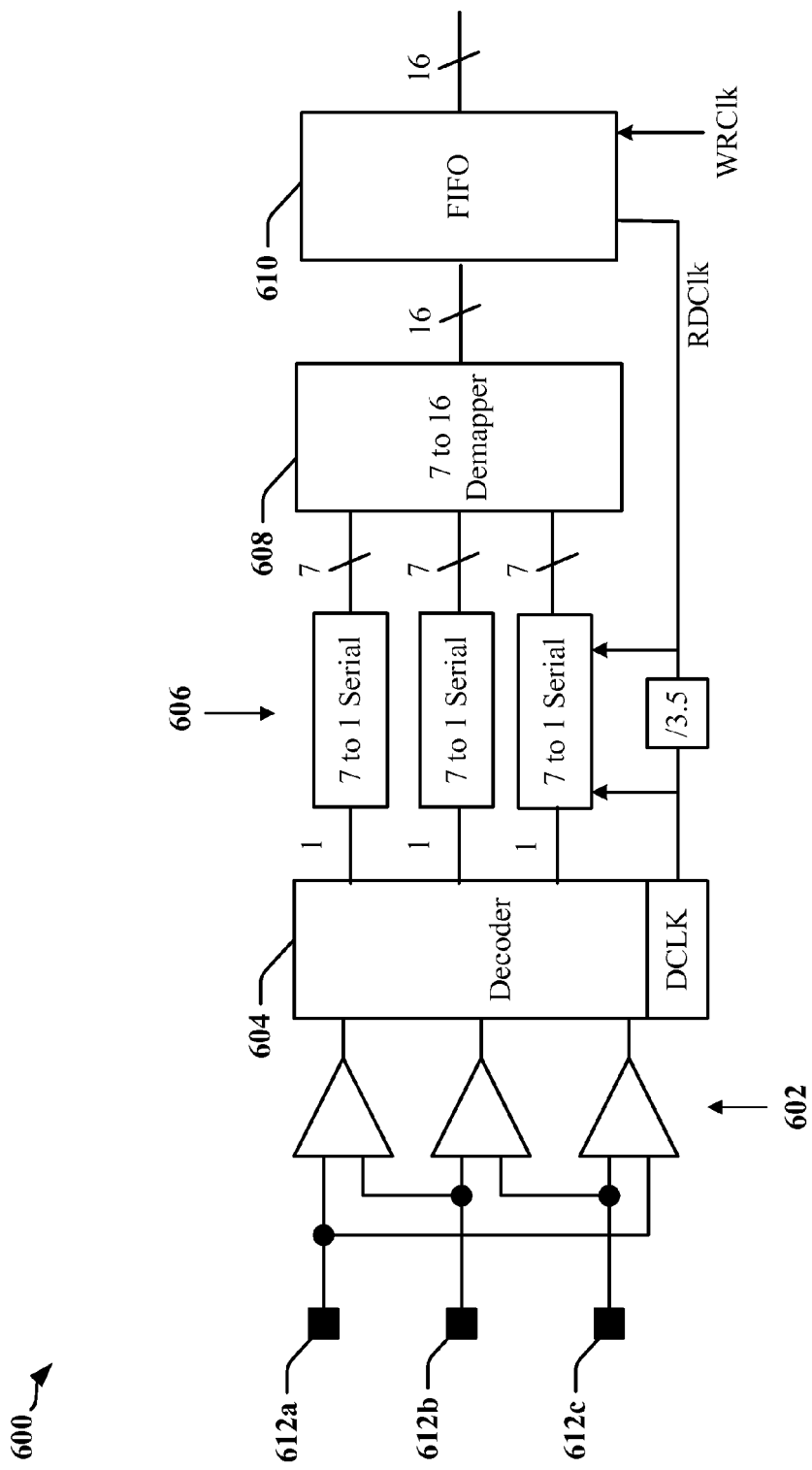
FIG. 6 illustrates an example of an N-phase polarity decoder.

FIG. 6 illustrates an example 600 of a receiver in a three-wire, three-phase physical layer (PHY). The three-wire, three-phase example is illustrative of certain principles of operation applicable to other configurations of M-wire, N-phase receivers. Comparators 602 and decoder 604 are configured to provide a digital representation of the state of each of three transmission lines 612a, 612b and 612c, as well as the change in the state of the three transmission lines compared to the state transmitted in the previous symbol period. Seven consecutive states are assembled by serial-to-parallel converters 606 to produce a set of 7 symbols to be processed by demapper 608 to obtain 16 bits of data that may be buffered in FIFO 610.

According to certain aspects disclosed herein, a plurality of three-state amplifiers can be controlled to produce a set of output states defined by a differential encoder, an N-phase polarity encoder, or another encoder that encodes information in wires or connectors that can assume one of the three states described.

With reference again to FIGS. 2 and 4, the communication link 220 may comprise a high-speed digital interface that can be configured to support both differential encoding scheme and N-phase polarity encoding. Physical layer drivers 210 and 240 may comprise N-phase polarity encoders and decoders, which can encode multiple bits per transition on the interface, and line drivers to drive connectors 410a, 410b and 410c. The line drivers may be constructed with amplifiers that produce an active output that can have a positive or negative voltage, or a high impedance output whereby a connector 410a, 410b or 410c is in an undefined state or a state that is defined by external electrical components. Accordingly, the output drivers 408 may receive by a pair of signals 416 that includes data and output control (high-impedance mode control). In this regard, the three-state amplifiers used for N-phase polarity encoding and differential encoding can produce the same or similar three output states. When used for differential encoding, pairs of the three-state amplifiers in a differential line driver 306, 316, 316' or 324 (see FIG. 3) may receive a same input signal and output control signal, whereas each of the N-phase polarity encoding line drivers 408 receive individual inputs that define output state. According to certain aspects disclosed herein, the inputs provided to each the N-phase polarity encoding line driver 408 may be controlled by logic and/or switches such that pairs of the line drivers 408 may be operated as a differential line driver 306, 316, 316' and 324.

Figure 7:
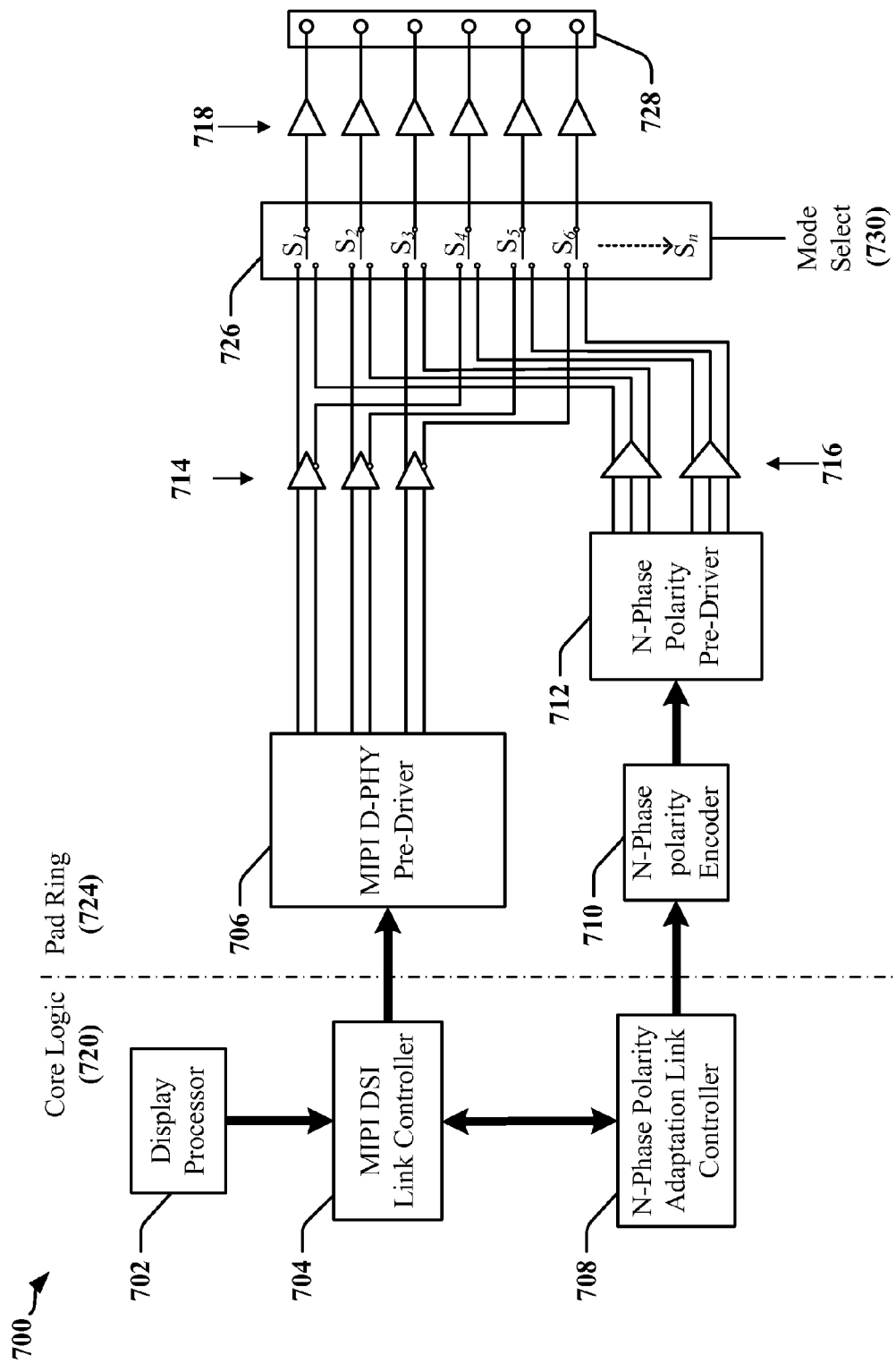
FIG. 7 illustrates a system architecture for an apparatus that may selectively use N-phase polarity encoding or differential signaling.

Certain embodiments provide a configurable interface that can selectively activate a desired number of wires to communicate data, and/or to reconfigure an M-wire, N-Phase Polarity encoded interface to serve as a differential interface. FIG. 7 illustrates an example in which mobile platform 700 employs pin multiplexing to provide a reconfigurable communications interface. In the depicted example, a display processor 702 generates display data for a display device 124 (see FIG. 1). The display processor 702 may be integrated with a processing circuit 206, for example. With reference also to FIG. 2, data may be transmitted through a communications link 220 to a device 230 that includes a display controller 232. The communications link 220 may be configurable to comply with or be compatible with a MIPI standard DSI or an N-Phase Polarity interface as described herein. FIG. 7 shows an example configuration in which a switching element 726 selects between the outputs of three differential drivers 714 and the outputs of two three-wire, three-phase encoders/drivers 716 to drive 6 output pins 728. Other combinations and configurations of the output drivers 728, drivers 714 and encoders/drivers 716 may be supported. In one example, the switching multiplexer 726 may comprise a switching matrix that allows output pins 728 to be mapped to any output of any differential driver 714 or any output of any M-wire, N-phase encoder.

When a MIPI DSI interface is configured, display pixel data originating from display processor 702 is provided to MIPI DSI Link Controller 704, which formats the display pixel data into packets to be sent over a high-speed serial interface 728 to Display, typically through device 230 and/or display controller 232. Both pixel data and control information may be transmitted over this interface 728. A reverse link may be provided for reading status from display 124, or to receive other information.

Data packets generated by the MIPI DSI Link Controller 704 in the digital core logic circuitry 720 may be provided to a MIPI D-PHY Pre-Driver 706, which may be realized in an input/output section (Pad Ring) 724. The data packets may be provided to a set of output drivers 718 through differential drivers 714 and/or an electronic switch multiplexer 726. The differential drivers 714 may be enabled while N-Phase drivers 716 are disabled. In one example, the N-Phase drivers 716 may be disabled when the N-Phase drivers 716 are forced or otherwise placed in high-impedance output mode.

In another example, the switch multiplexer 726 may select between differential drivers 714 and N-Phase drivers 716 to provide inputs to line drivers 718 when N-Phase Polarity encoding is required. The switch multiplexer 726 may be operated to select the outputs of the N-Phase drivers 716 as inputs to the output line drivers 718. Alternatively or additionally, the N-Phase drivers 716 may be enabled while differential drivers 714 are disabled and vice versa. In this configuration, data packets generated by MIPI DSI Link Controller 704 may be encoded using an N-Phase Polarity encoder 710 and provided to N-Phase Polarity pre-driver 712.

The determination of whether one or more of the line drivers 718 is in high impedance mode may be made by the encoder used to format data. In one example, output control (high impedance control) of the line drivers 718 may be controlled by the MIPI D-PHY Pre-Driver 706, when the interface is driven in a differential encoding mode. In another example, output control of the line drivers 718 may be controlled by the N-Phase Polarity pre-driver 712, when the interface is driven in N-Phase Polarity encoding mode.

According to certain aspects described herein, data packets similar to MIPI DSI packets are sent over an N-Phase Polarity link. Some packets may be reformatted to make proper use of symbol groups on the N-Phase Polarity link. For example, a byte may be added to odd-length packets when the MIPI DSI may be byte-oriented, while the N-Phase Polarity link is configured for transferring 16-bit words at a time. Transmitters and receivers may be configurable to account for differences in link synchronization between N-Phase Polarity encoding and differential encoding.

An M-wire N-phase link controller 708 may provide input data words to data as input to a mapper 402 (cf. FIG. 4), which maps the input word to a series of symbols to be sent over the bus. The mapper 402 may be embodied in an encoding element 710. One purpose of the mapper 402 is to compute the values of a group of symbols based on an input data word. This may be particularly useful if the number of bits per symbol is not an integer. In the simple example described in relation to FIG. 4, a three-wire, three-phase system is employed in which there are 3 possible combinations of 2 wires to be driven simultaneously, given that one wire is undriven. There are also 2 possible combinations of polarity for each pair of wires that may be driven, yielding 6 possible states. 5 of the 6 states are usable because a transition is required between any two symbols. With 5 states there may be $\log_2(5) \cong 2.32$ bits per symbol. The mapper may accept a 16-bit word and convert it to 7 symbols.

Data packets generated by N-Phase Polarity Adaptation Link Controller 708 may be provided to N-Phase Polarity Encoder 710 to encode groups of link data (for example, 16-bit or 32-bit words) into groups of symbols, and outputs one symbol at a time to N-Phase Polarity Pre-Driver 712. In one example, N-Phase Polarity Adaptation Link Controller 708 may be realized in Digital Core Logic 720, and N-Phase Polarity Encoder 710 may be realized in the Pad Ring 724. The pre-driver 712 may amplify received input signals to a level sufficient to drive buffers 716 and/or Output Driver 718.

The switch multiplexer 726 may select either MIPI D-PHY Pre-Driver 706 output or N-Phase Polarity Pre-Driver 712 output to be provided to Output Drivers 718. The switch multiplexer 726 may transmit signals having a voltage or current level much lower than the output of Output Drivers 718. Accordingly, the output signals from MIPI D-PHY Pre- Driver 706 and/or N-Phase Polarity Pre-Driver 712 may be easily switched using an IC device. In some instances, control signals that determine if one or more output drivers should be in a high impedance state may be switched using switch multiplexer 726 or a related switching device.

The mode select 730 state of the switch multiplexer 726 may be set to a default or preconfigured selection when the system is powered up. Typically, this state need be configured only once because the display 124 may be permanently or semi-permanently attached to the processing circuit 102 (see FIG. 1). Consequently, the switch multiplexer may be configured during manufacture and the setting need not be changed during normal operation of the system. In one example, the switch multiplexer 726 may be addressed by a processor 206 or 236 through one or more configuration registers, which may be non-volatile. Code for programming the switch multiplexer may be stored in storage 112. The use of the switch multiplexer 726 to switch low-level signals permits the same application processor to be used for more than one interface, without the need to duplicate I/O pads or pins. The same I/O pads or pins 728 may therefore be used for more than one interface, where programming of the switch multiplexer need only be performed once per system.

The principles of operation described in relation to FIG. 7 may be applied in a wide variety of applications and a pin multiplexer may be employed to provide a flexible and reconfigurable communications link between different types of devices and in different types of apparatus, including applications that are not governed by industry standards.

Figure 8:
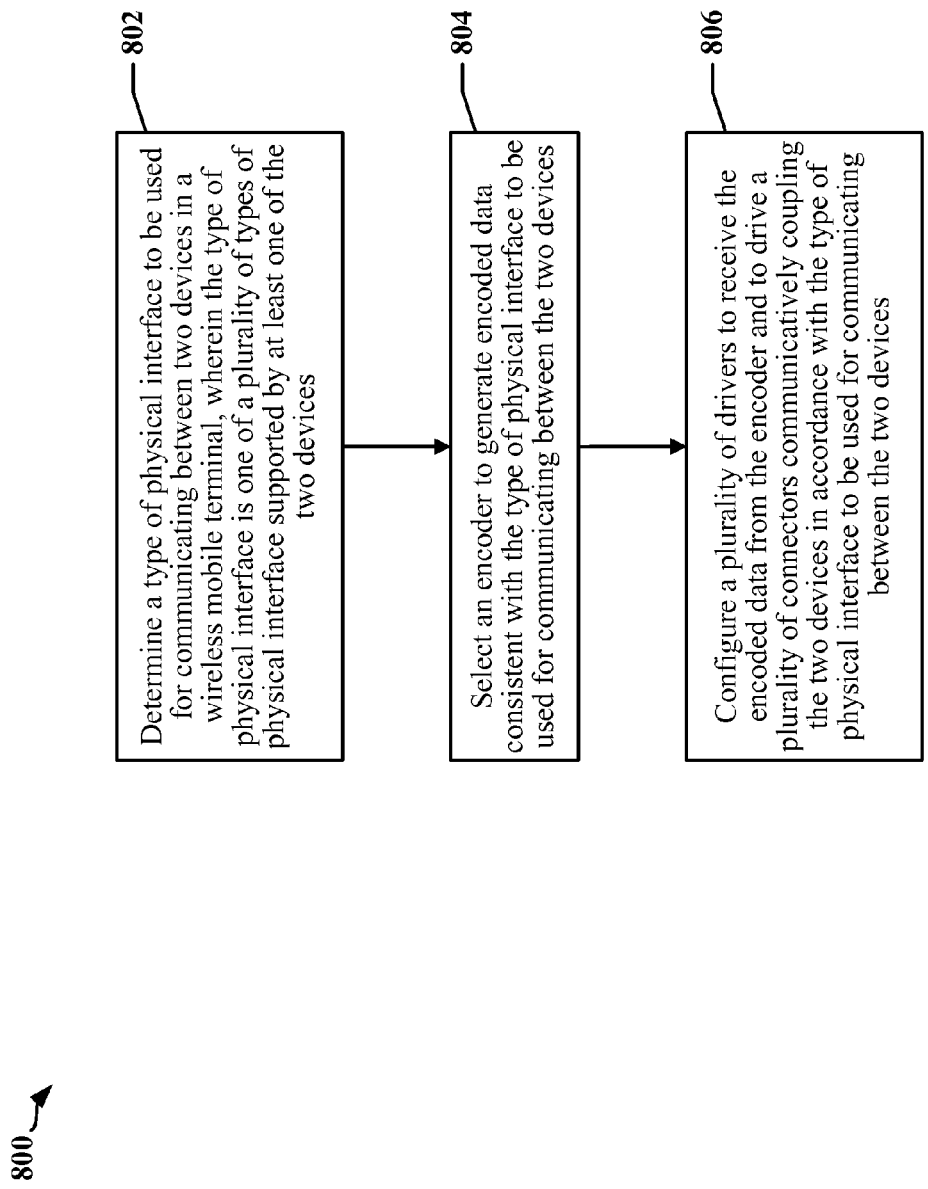
FIG. 8 is a flow chart of a method for selective N-phase polarity encoding.

FIG. 8 is a flowchart illustrating an encoding system according to certain aspects of the invention. The method may be performed by one or more IC devices. At step 802, the one or more IC devices may determine a type of physical interface to be used for communicating between two devices in a wireless mobile terminal. The type of physical interface may be one of a plurality of types of physical interface supported by at least one of the two devices. One or more of the devices may include an N-phase encoder and a differential encoder, for example.

At step 804, the one or more IC devices may select an encoder to generate encoded data consistent with the type of physical interface to be used for communicating between the two devices. The data may be communicated over a bus having a plurality of connectors communicatively coupling the two devices. The plurality of connectors may include at least some bidirectional connectors. The connectors may include electrical or optical connectors.

According to certain aspects disclosed herein, the encoder may provide the encoded data in differentially encoded signals. Configuring the plurality of drivers to receive the encoded data may include causing one or more outputs of another encoder to enter a high impedance mode. The other encoder may include an N-phase encoder.

According to certain aspects disclosed herein, the selected encoder may provide the encoded data in a sequence of symbols encoded using a combination of a phase state of a first pair of the connectors, a polarity of a second pair of connectors, and a selection of at least one undriven connector. The first pair of the connectors may comprise the same wires as the second pair of connectors or at least one different wire. Configuring the plurality of drivers to receive the encoded data may include causing one or more outputs of a differential encoder to enter a high impedance mode.

At step 806, the one or more IC devices may configure a plurality of drivers to receive the encoded data from the encoder and to drive a plurality of connectors communicatively coupling the two devices in accordance with the type of physical interface to be used for communicating between the two devices. The plurality of drivers may be configured by controlling a plurality of switches to couple outputs of the encoder to the plurality of drivers.

In an aspect of the disclosure, the encoded data may relate to a camera or a display controlled by one of the two IC devices.

Figure 9:
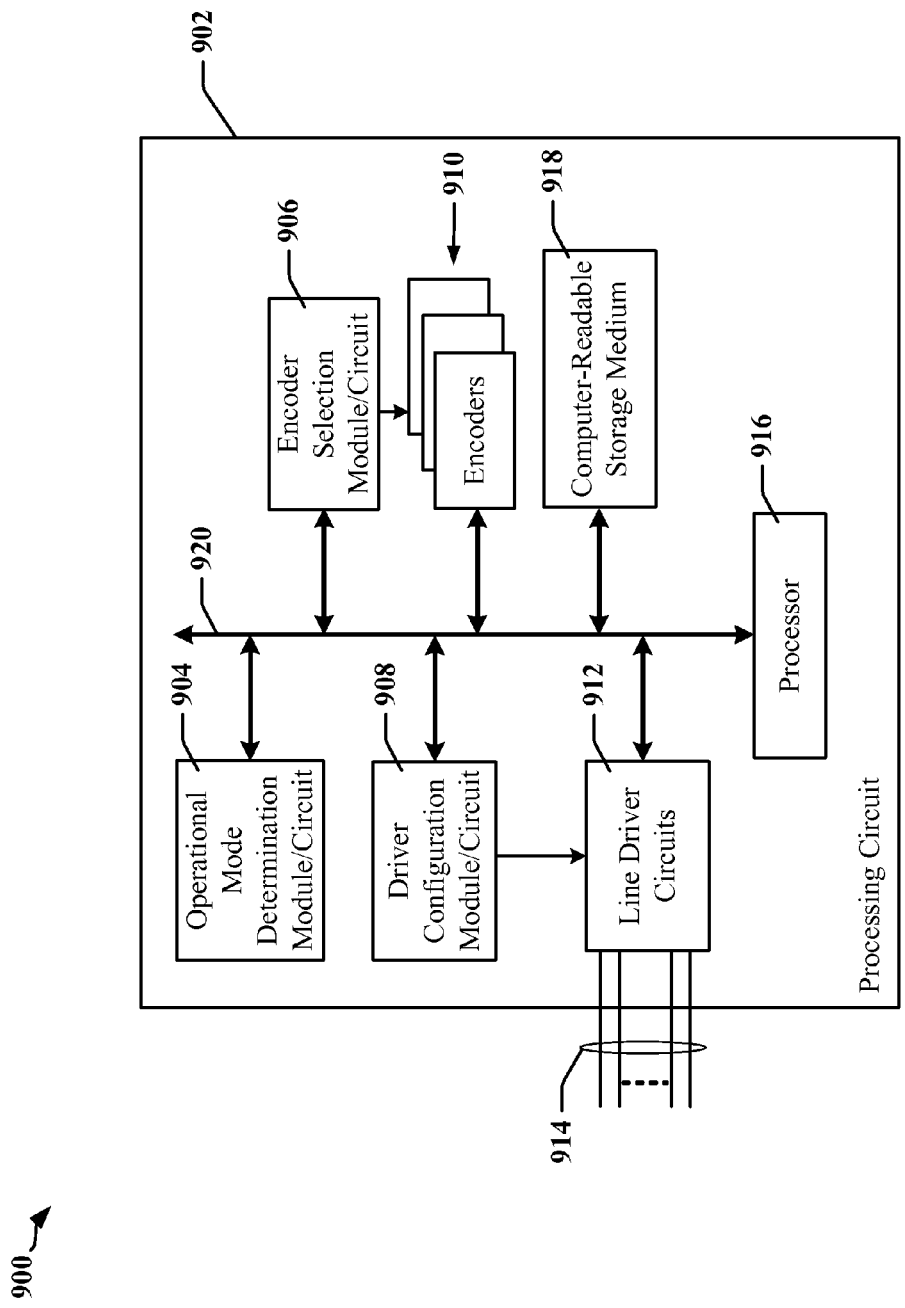
FIG. 9 is a diagram illustrating an example of a hardware implementation for an apparatus employing N-phase polarity data encoding.

FIG. 9 is a diagram illustrating a simplified example of a hardware implementation for an apparatus 900 employing a processing circuit 902. The processing circuit 902 may be implemented with a bus architecture, represented generally by the bus 920. The bus 920 may include any number of interconnecting buses and bridges depending on the specific application of the processing circuit 902 and the overall design constraints. The bus 920 links together various circuits including one or more processors and/or hardware modules, represented by the processor 916, the modules or circuits 904, 906 and 908, a plurality of different encoders 910, line drivers configurable to drive connectors or wires 914 and the computer-readable storage medium 918. The bus 920 may also link various other circuits such as timing sources, peripherals, voltage regulators, and power management circuits, which are well known in the art, and therefore, will not be described any further.

The processor 916 is responsible for general processing, including the execution of software stored on the computer-readable storage medium 918. The software, when executed by the processor 916, causes the processing circuit 902 to perform the various functions described supra for any particular apparatus. The computer-readable storage medium 918 may also be used for storing data that is manipulated by the processor 916 when executing software. The processing circuit 902 further includes at least one of the modules/circuits 904, 906 and 908. The modules may be software modules running in the processor 916, resident/stored in the computer readable storage medium 918, one or more hardware modules coupled to the processor 916, or some combination thereof.

In one configuration, the apparatus 900 for wireless communication includes means 904 for determining an operational mode for communicating between the two IC devices, means 906 for selecting one of encoders 910 to provide encoded data for transmission on the plurality of connectors 914, and means 908 for configuring a plurality of drivers 912 to receive encoded data from the encoder 910 and to drive the connectors and/or wires 914. The aforementioned means may be one or more of the aforementioned modules of the apparatus 900 and/or the processing circuit 902 of the apparatus 900 configured to perform the functions recited by the aforementioned means. The aforementioned means may be implemented, for example, using some combination of a processor 206 or 236, physical layer drivers 210 or 240 and storage media 208 and 238.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A multiplexer, comprising:
a plurality of line drivers, wherein an output of each line driver is coupled to a corresponding connector of a communications link;
a plurality of switches configurable for a plurality of modes of operation, wherein in a first mode of operation the plurality of switches is configured such that the plurality of line drivers is coupled to differential drivers, and in a second mode of operation the plurality of switches is configured such that the plurality of line drivers is coupled to M-wire, N-phase drivers; and
one or more configuration registers configured to receive a control input that determines a current mode of operation,
wherein a plurality of states is defined for each line driver output, including an undriven state, a first driven state, and a second driven state, the second driven state having a polarity opposite the first driven state.

2. The multiplexer of claim 1, wherein each line driver output switches between the first driven state and the second driven state when the current mode of operation is the first mode of operation.

3. The multiplexer of claim 1, further comprising:
a first encoder that is activated during the first mode of operation; and
a second encoder that is activated during the second mode of operation.

4. The multiplexer of claim 3, wherein the plurality of switches selects encoded signals provided by the first encoder as inputs for the plurality of line drivers when the current mode of operation is the first mode of operation, and encoded signals provided by the second encoder as inputs for the plurality of line drivers when the current mode of operation is the second mode of operation.

5. The multiplexer of claim 3, wherein when the current mode of operation is the second mode of operation, at least one line driver output is in the first driven state, at least one line driver output is in the second driven state, and at least one line driver output is in the undriven state for each of a succession of symbols transmitted on the communications link.

6. The multiplexer of claim 3, wherein the first encoder comprises a Mobile Industry Processor Interface Alliance Display System Interface (MIPI DSI) encoder.

7. The multiplexer of claim 3, wherein the second encoder comprises a mobile display digital interface (MDDI) encoder.

8. The multiplexer of claim 3, wherein the second encoder encodes data in transitions in the states of the output of one or more of the plurality of line drivers between consecutive symbols in a sequence of symbols transmitted on the communications link.

9. The multiplexer of claim 8, wherein the transitions in the states of the line driver outputs include phase state transitions.

10. The multiplexer of claim 8, wherein the transitions in the states of the line drivers output include polarity state transitions.

11. The multiplexer of claim 1, wherein the communications link comprises at least some bidirectional connectors.

12. A method, comprising:
coupling outputs of a plurality of line drivers to corresponding connectors of a communications link;
determining a current mode of operation of the communications link based a setting in on one or more configuration registers; and
configuring a plurality of switches based on the current mode of operation, wherein in a first mode of operation the plurality of line drivers is coupled to differential drivers, and in a second mode of operation the plurality of line drivers is coupled to M-wire, N-phase drivers,
wherein a plurality of states is defined for each line driver output, including an undriven state, a first driven state, and a second driven state, the second driven state having a polarity opposite the first driven state.

13. The method of claim 12, wherein each line driver output switches between the first driven state and the second driven state when the current mode of operation is the first mode of operation.

14. The method of claim 12, further comprising:
activating a first encoder during the first mode of operation; and
activating a second encoder during the second mode of operation.

15. The method of claim 14, wherein the plurality of switches selects encoded signals provided by the first encoder as inputs for the plurality of line drivers when the current mode of operation is the first mode of operation, and encoded signals provided by the second encoder as inputs for the plurality of line drivers when the current mode of operation is the second mode of operation.

16. The method of claim 14, wherein when the current mode of operation is the second mode of operation, at least one line driver output is in the first driven state, at least one line driver output is in the second driven state, and at least one line driver output is in the undriven state for each of a succession of symbols transmitted on the communications link.

17. The method of claim 14, wherein the first encoder comprises a Mobile Industry Processor Interface Alliance Display System Interface (MIPI DSI) encoder.

18. The method of claim 14, wherein the second encoder comprises a mobile display digital interface (MDDI) encoder.

19. The method of claim 14, wherein the second encoder encodes data in transitions in the states of the output of one or more of the plurality of line drivers between consecutive symbols in a sequence of symbols transmitted on the communications link.

20. The method of claim 19, wherein the transitions in the states of the output of one or more of the plurality of line drivers include phase state transitions.

21. The method of claim 19, wherein the transitions in the states of the output of one or more of the plurality of line drivers include polarity state transitions.

22. The method of claim 12, wherein the communications link comprises at least some bidirectional connectors.

23. An apparatus, comprising:
a plurality of line drivers coupled to corresponding connectors of a communications link;

means for determining a current mode of operation of the communications link, wherein the means for determining includes one or more configuration registers; and means for configuring the apparatus based on the current mode of operation, wherein in a first mode of operation the plurality of line drivers is coupled to differential drivers, and in a second mode of operation the plurality of line drivers is coupled to M-wire, N-phase drivers, wherein a plurality of states is defined for each line driver output, including an undriven state, a first driven state, and a second driven state, the second driven state having a polarity opposite the first driven state.

24. The apparatus of claim 23, wherein each line driver output switches between the first driven state and the second driven state when the current mode of operation is the first mode of operation.

25. The apparatus of claim 23, further comprising:
a first encoder that is activated during the first mode of operation; and
a second encoder that is activated during the second mode of operation.

26. The apparatus of claim 25, wherein the means for configuring the apparatus comprises:
a plurality of switches operable to select encoded signals provided by the first encoder as inputs for the plurality of line drivers when the current mode of operation is the first mode of operation, and encoded signals provided by the second encoder as inputs for the plurality of line drivers when the current mode of operation is the second mode of operation.

27. The apparatus of claim 25, wherein when the current mode of operation is the second mode of operation, at least one line driver output is in the first driven state, at least one line driver output is in the second driven state, and at least one line driver output is in the undriven state for each of a succession of symbols transmitted on the communications link.

28. The apparatus of claim 25, wherein the first encoder comprises a Mobile Industry Processor Interface Alliance Display System Interface (MIPI DSI) encoder.

29. The apparatus of claim 25, wherein the second encoder comprises a mobile display digital interface (MDDI) encoder.

30. The apparatus of claim 25, wherein the second encoder encodes data in state transitions in one or more line driver outputs between consecutive symbols in a sequence of symbols transmitted on the communications link.

31. The apparatus of claim 30, wherein the state transitions in the one or more line driver outputs include phase state transitions.

32. The apparatus of claim 30, wherein the state transitions in the one or more line driver outputs include polarity state transitions.

33. The apparatus of claim 23, wherein the communications link comprises at least some bidirectional connectors.

34. A non-transitory computer-readable storage medium comprising code for:
coupling outputs of a plurality of line drivers to corresponding connectors of a communications link;
determining a current mode of operation of the communications link based a setting in on one or more configuration registers; and
configuring a plurality of switches based on the current mode of operation, wherein in a first mode of operation the plurality of line drivers is coupled to differential drivers, and in a second mode of operation the plurality of line drivers is coupled to M-wire, N-phase drivers,
wherein a plurality of states is defined for each line driver output, including an undriven state, a first driven state, and a second driven state, the second driven state having a polarity opposite the first driven state.

35. The computer-readable storage medium of claim 34, wherein each line driver output switches between the first driven state and the second driven state when the current mode of operation is the first mode of operation.

36. The computer-readable storage medium of claim 34, further comprising:
activating a first encoder during the first mode of operation; and
activating a second encoder during the second mode of operation.

37. The computer-readable storage medium of claim 36, wherein the plurality of switches selects encoded signals provided by the first encoder as inputs for the plurality of line drivers when the current mode of operation is the first mode of operation, and encoded signals provided by the second encoder as inputs for the plurality of line drivers when the current mode of operation is the second mode of operation.

38. The computer-readable storage medium of claim 36, wherein when the current mode of operation is the second mode of operation, at least one line driver output is in the first driven state, at least one line driver output is in the second driven state, and at least one line driver output is in the undriven state for each of a succession of symbols transmitted on the communications link.

39. The computer-readable storage medium of claim 36, wherein the first encoder comprises a Mobile Industry Processor Interface Alliance Display System Interface (MIPI DSI) encoder.

40. The computer-readable storage medium of claim 36, wherein the second encoder comprises a mobile display digital interface (MDDI) encoder.

41. The computer-readable storage medium of claim 36, wherein the second encoder encodes data in transitions in the states of the output of one or more of the plurality of line drivers between consecutive symbols in a sequence of symbols transmitted on the communications link.

42. The computer-readable storage medium of claim 41, wherein the transitions in the states of the output of one or more of the plurality of line drivers include phase state transitions.

43. The computer-readable storage medium of claim 41, wherein the transitions in the states of the output of one or more of the plurality of line drivers include polarity state transitions.

44. The computer-readable storage medium of claim 34, wherein the communications link comprises at least some bidirectional connectors.

* * * * *